March 3, 1970   J. OPPENHEIMER   3,498,293
ORIENTATION APPARATUS FOR HUMAN SUBJECTS
Filed Oct. 6, 1966   2 Sheets-Sheet 1
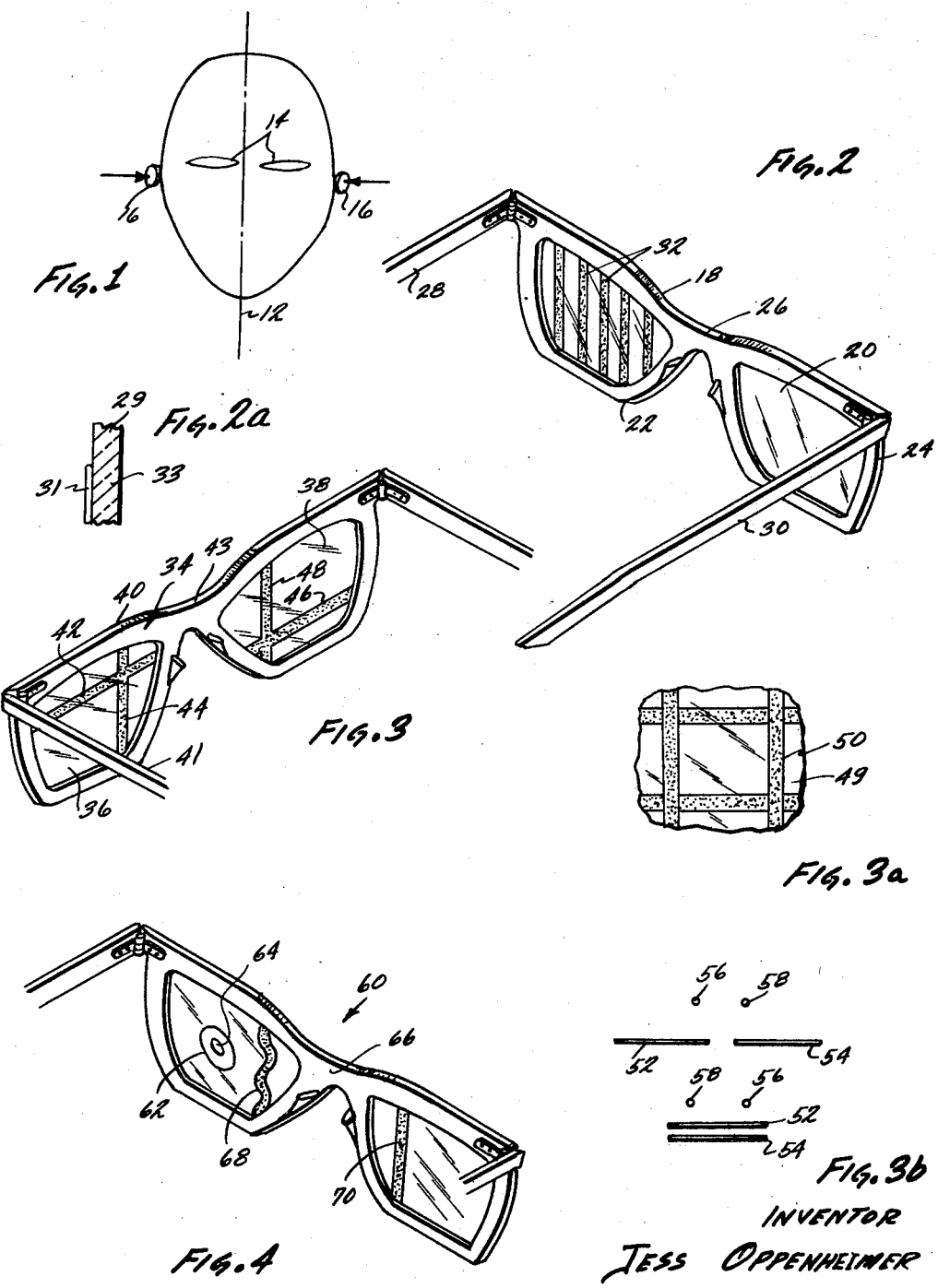

March 3, 1970   J. OPPENHEIMER   3,498,293
ORIENTATION APPARATUS FOR HUMAN SUBJECTS
Filed Oct. 6, 1966   2 Sheets-Sheet 2
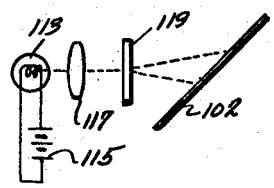
FIG. 7
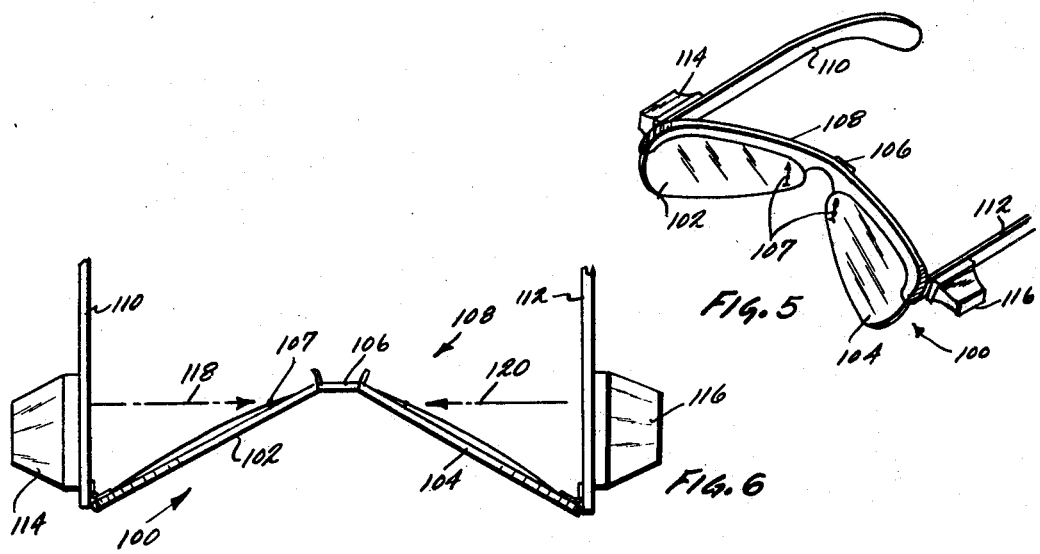
FIG. 5
FIG. 6
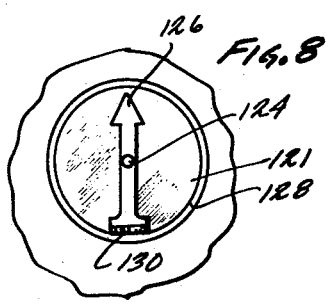
FIG. 8
INVENTOR
JESS OPPENHEIMER
BY Nilsson, Robbins & Anderson
ATTORNEYS

United States Patent Office 3,498,293
Patented Mar. 3, 1970

3,498,293
ORIENTATION APPARATUS FOR HUMAN
SUBJECTS
Jess Oppenheimer, 549 Moreno,
Los Angeles, Calif. 90049
Filed Oct. 6, 1966, Ser. No. 584,714
Int. Cl. A61h 5/00; G02c 7/16
U.S. Cl. 128—76.5     5 Claims

ABSTRACT OF THE DISCLOSURE

Laterally-supported concentrator devices, providing spaced-apart reference or individually distinguishable i.e. complementary sensations, are disclosed to be supported at like, opposed body locations. Several specific forms are disclosed including eyepieces which each carry one component (two perpendicular lines) of a square, supported in a frame whereby the wearer fuses the two complementing components to maintain a visual "square" and thereby preserve stability. Orientation sensors (gravity) are also disclosed to provide variable sensation images, as for use by persons in flight. Tactile and auditory concentrator units are also disclosed.

---

The present invention relates to orientation devices for human subjects, and more specifically to structures for use by persons for assistance in preserving and maintaining sensory fusion and orientation with respect to their physical evironment.

To understand the present invention it is helpful to remember that the human body is constructed as two similar lateral halves; that is, man is a symmetrical being. The brain that directs the sensorimeter activity is symmetrical. In effect there are two interconnecting brains. In this regard, each eye perceives a distinct image, each ear observes sound at a different location, the tactile experiences are independent, and in general the two halves or sides of the body undergo independent sensory experiences or stimuli. Ideally, these independent stimuli or sensations are coordinated or integrated in the brain by being fused in a manner which orients a person with respect to his physical environment so as to coordinate his motion, and to enable him to accurately perceive the motion of various objects relative to him.

Considering optical sensation as a specific example, the two eyes perceive a field of vision from two distinct viewpoints, providing essentially two separate fields of vision. The visual stimuli coming in from the left eye goes to the left as well as to the right hemisphere of the brain as does the visual stimuli from the right eye. These four visual stimuli must be "pulled" together. The brain does the "pulling" together by mentally fusing the stimuli to provide dimensional vision, or the stereoscopic effect. In this fusion process the two visual fields are in the closest registration, i.e., they overlap, and the brain interprets the differences between them as spaced distance. In a somewhat similar manner of fusion or information coordination, the information sensed by the displaced ears afford directional sensitivity for determining the location of sound sources.

To accomplish such fusion the individual must have a point of reference around which to organize the relative impressions received from the various sensorial organs so he can impose some kind of order upon them and construct a coherent totality. Such a point of reference is the "body image"; i.e., the ability of the brain to fuse the multitude of sensory information coming to it to provide constant awareness of the position of all body parts relative to each other and to gravity. It involves being able to visualize these elements or body parts in movement, in different positions and spatial relationships.

The ease with which the distinct information perceived from the lateral sensory organs may be coordinated or fused varies among people and with environment. For example, persons having keen fusion capabilities for lateral sensations normally possess accurate depth perception, good directional sensitivity and in general are physically well coordinated. Conversely, persons having poor, or even no fusion capability may suffer an extreme physical handicap. Specifically, for example, one form of fusion failure results in the inability to accomplish retinal correspondence in which the two planar images perceived by the eyes are fused into a three-dimensional or stereoscopic object. In reacting to this lack of fusion, the central nervous system may compensate in any of several patterns, as by totally rejecting one of the images, sequentially accepting the images alternately from the two eyes or diverting one of the eyes to an extreme in which it is ineffective and can be ignored. These compensation patterns improve the person's ability to orient himself in that he at least has one planar image; however, his depth perception is lacking.

In "normal" situations, one eye is dominant and is used for fixation, the other eye simply moving in concert with it. In other situations, the central nervous system may not select or favor a dominant image from one eye, the muscles of the non-dominant eye are too weak to effect registration, or there is unequal innervation. As a result, if the brain does not use one of the compensation patterns, the person is presented a wildly disorganized scene of flying objects set entirely in a single plane with his attention commanded first by one object, then another. Concentration by the person to focus his attention on a single object or area under these conditions is extremely difficult and trying. As a result, the person is not only severly physically handicapped but furthermore, the uncorrected strain of living out of orientation in relation to surrounding physical objects can produce severe psychological problems.

The lateral (and/or vertical) difficulty of fusing optical images may also be related to other dual senses. That is, persons experiencing the problems of visual fusion may also have difficulty fusing the stimuli sensed independently by their two ears, or fusing tactile stimuli sensed from two points on their body. Thus, while most individuals can accomplish fusion of perceived stimuli to effectively orient themselves with respect to their surroundings and develop a body image, persons suffering from difficulties in this regard not only have trouble maintaining orientation but also may have difficulty preserving a point of consciousness or center of attention. That is, considering the vast multitude of stimuli continually perceived (including hundreds of objects in a field of vision, a multitude of random sounds, and the variety of tactile stimuli from skin-contact points) without fusion, the person becomes completely incapable of selectively orienting his senses for effective control. In this regard, persons with lesser fusion capability frequently must exert extreme mental effort to accomplish routine physical tasks. That is, the failure of the central nervous system to unconsciously accomplish fusion necessitates that a concentrated effort be made to compensate. If the individual can accomplish fusion at all, the effort is continually required to maintain it. During intervals when the various stimuli or perceived information is not fused, physical manipulations performed by the subject individual demand an exhausting effort. Some appreciation of this effort may be realized by considering an existence in which the central nervous system fails to organize information perceived by the senses to provide orientation as normally enjoyed. The human operation can be analogized to that of controlling and directing an unseen robot from a multitude of communication channels all of which continually deliver data with no precedence. A further manifestation of laterality difficulty may be stuttering speech. For example, a disoriented person lacking a reference for organization and faced with a disarray of data may concentrate so intently on listening to his own speech that a conflict arises between speaking and listening with pathetic stuttering resulting.

The laterality problems and difficulty of fusion may stem from brain damage or may be of a congenital nature. However, laterality problems are not always limited to persons with a low degree of fusion capability. For example, in certain flight environments, aircraft pilots can experience a loss of orientation. Normally, their orientation is promptly reestablished with the assistance of their surroundings and the aircraft instruments. However, not infrequently, such reorientation becomes difficult as a result of buffeting which moves the pilot about relative to his surroundings and the results can be tragic. In addition to air space, ocean depths and outer space are also environments in which persons even having keen fusion capabilities can lose their orientation. Such loss of orientation may leave the person incapable of controlling his movements or even of perceiving his physical surroundings. The multitude of perceived stimuli then present a confused disarray in which reorientation may be hopeless and tragedy is likely. Furthermore, those participating in sports often momentarily lose orientation, resulting in inaccurate physical movements and thereby improper results in the sport; e.g., a golfer moving his head during the swing. It is, therefore, apparent that a considerable need exists for orientation apparatus for use by human subjects to assist sensory coordination which may be employed by persons likely to encounter loss of fusion or for training or exercise purposes to improve fusion capabilities.

It is therefore an object of the present invention to provide an improved physical appliance useful in accomplishing and preserving conscious orientation by human subjects by supplying a sensory stimulus which maintains a constant relationship to the subject and can be used by him to reestablish or preserve orientation with his environment.

It is another object of the present invention to provide an improved apparatus incorporating concentrators affixed to a human subject which may be effectively employed to accomplish and maintain equilibrium and orientation.

Still another object of the present invention is to provide an improved orientation appliance for use by human beings to accomplish and maintain optical-image fusion.

Still another object of the present invention is to provide an improved appliance to be worn by human subjects for accomplishing and preserving stereo-sensory fusion.

Still another object of the present invention is to provide an improved appliance useful by individuals in accomplishing and preserving a point of consciousness with reference to received stimuli which may be visual, audio, or tactile sensory.

Another object of the present invention is to provide an improved orientation apparatus incorporating a concentrator to provide stereo-sensory reference sensations to a human subject, and further including means for affixing said concentrator for use by a human subject at a spaced location from the subject's physical centerline.

These and other objects and advantages of the present invention will become apparent to one skilled in the art from a consideration of the following description taken in conjunction with the appended figures wherein:

FIGURE 1 is a diagrammatic representation illustrating dual or lateral sensory perception;

FIGURE 2 is a perspective and diagrammatic view of an apparatus constructed in accordance with the principles of the present invention;

FIGURE 2a is a sectional, fragmentary view through the structure of FIGURE 2;

FIGURE 3 is a perspective and diagrammatic view of another apparatus constructed in accordance with the present invention;

FIGURE 3a is a diagrammatic representation of a field of vision;

FIGURE 3b is a diagrammatic representation illustrating stereo-optic composition;

FIGURE 4 is a perspective view of still another apparatus constructed in accordance with the present invention;

FIGURE 5 is a perspective view of still another apparatus constructed in accordance with the present invention;

FIGURE 6 is a top plan view of the structure of FIGURE 6;

FIGURE 7 is a diagrammatic view illustrating the operation of elements in the structure of FIGURE 7; and FIGURE 8 is a plan view of one of the elements shown in FIGURE 7.

Referring initially to FIGURE 1, there is shown a symbolic representation 10 of a human head with an indicated centerline 12 dividing the lateral sensory organs including indicated eyes 14 and ears 16, substantially equally displaced. In general, the preservation of the individual equilibrium that is required for a human subject to effectively perform physical movements demands that the stimuli perceived on either side of the line 12 be composed to define a unitary body of intelligence. For example, the eyes 14 perceive two distinct fields of vision as a result of their displacement; however, the two fields are of similar scope and desirably are composed to provide a unitary stereoscopic presentation.

As explained above, persons possess varying degrees of ability to accomplish and preserve the fusion of stimuli sensed on either side of the center line 12. Furthermore, upon loss of orientation or equilibrium, a person may have a feeling of complete detachment from any stable reference. For example, an aircraft pilot experiencing loss of orientation by being buffeted about may be incapable of referring to physical objects within the cockpit to reestablish his orientation. In such a state, completely unable to organize the multitude of perceived stimuli, the pilot is usually unable to perform requisite control operations. In accordance with the present invention, it has been discovered that by providing stimuli in the form of a concentrator device which is intimately associated with the human body to accomplish a constant frame of reference, persons experiencing loss of orientation are greatly assisted in recovering and preserving a state of fusion.

Referring now to FIGURE 2, there are shown a pair of glasses including eyepieces or lenses 18 and 20 which may incorporate a corrective prescription, or may be plain glass, and which are supported in frames 22 and 24 respectively, joined by a nosepiece 26 and connected to ear-holders 28 and 30, respectively. The lens 20 is substantially clear; however, the lens 18 carries an array of parallel vertical lines 32. The lines may take a wide variety of different forms including etched markings, dyes, opaque paints, and so on. Specifically, for example, the lens 18 as shown in FIGURE 2a, may comprise a glass base 29 backed by lines formed by strips 31 of opaque plastic material.

The subject wearing the glasses as shown in FIGURE 2 perceives one field of vision through the clear lens 20 and another field of vision through the marked lens 18. At a time when the subject is oriented and is properly fusing the stimuli perceived independently by his eyes, the two fields of vision are substantially superimposed. Therefore, the subject "sees" a physical scene of dimensioned objects arranged behind a screen or grid of parallel lines 32. It is to be noted, that even though the lines 32 are opaque, the subject still sees a full field of vision because the information blocked by the lines 32 passes freely through the lens 20 to be perceived by the eye thereunder and transmitted to each half of the brain.

In using the apparatus of FIGURE 2, the lens 20 serves the subject's dominant eye while the lens 18 serves the recessive eye. As a result, the subject is provided with an optical reference in the form of the parallel concentrator or lines 32 which will accomplish considerable stability. For example, persons who frequently experience loss of orientation may be thrown into such a loss by witnessing a scene containing a rapidly-moving object. Specifically, the person might observe an automobile to the extent that one eye would continue to follow the automobile beyond the capability of the other eye resulting in loss of fusion. The time required for reorientation after such an experience may vary from an imperceivably short interval to an extended period.

In considering the structure of FIGURE 2 the concentrator or lines 32 are fixed in front of the non-dominant eye and afford the subject a frame of reference which may be successfully employed with the dominant eye fixed on a pursuit object to avoid the situation in which a moving object causes loss of orientation. That is, the subject, now presented with a field of vision defined by grids, may consciously observe the passage of the moving object through the field of vision while utilizing the grids to restrain subconscious tracking which would produce loss of orientation, i.e., the object alternately goes behind a line and into the clear with lines remaining still. It appears that as the object moves through the grid, the lines momentarily break fusion after which it is re-established, much the same as frames of motion picture film moving into position for projection momentarily. Additionally, the subject may maintain his head still and move his eye to follow the object. In either case, if in so doing the vertical lines 32 remain still, then the subject knows there is a corresponding retinal field of vision and the eyes are each functioning properly, and the image retention is complete while the subject is consciously unaware of the break which occurs in the fusion. While reading, a subject can select a single vertical line, or alternatively use a lens with only one line thereon, which is held stationary in the middle of the copy being read. If the eyes function properly as the subject reads, the line remains stationary. A direct analogy would be a person watching a tennis match with a post directly in front of him. If his eyes are in register, the post remains still, if not it will appear to move.

It should be further understood that the concentrator may take any form desired and be used for various purposes. For example, as shown in FIGURE 4, the concentrator 60 may take the form of an annulus 62 placed on the lens which is used with the non-dominant eye of the subject. Any item upon which the subject fixes with his dominant eye may be centered in the opening 64 of the annulus which appears only in front of the non-dominant eye thus assuring a condition of retinal correspondence.

This technique has been found very effective not only for training purposes but for general use by afflicted persons. It appears that a sort of aligned triangulation occurs between the subject's eye, the concentrator such as lines 32, or annulus 62, and the object of concentration. That is, the fovea (point of acute visual sensation on the retina) is provided an axis of alignment in cooperation with the particular object under observation. Furthermore, improved stereopsis occurs as a result of the constant frame of reference provided fixed to the subject's body.

In addition to the reference assistance provided by the structure of FIGURE 2 or FIGURE 4, it has also been found desirable to provide other forms of concentrators for assisting the accomplishment or preservation of fusion with a stereosensory pattern readily adaptable to composition. Such a structure is shown in FIGURE 3 wherein glasses 34 are indicated to include lenses 36 and 38 supported in a mounting frame 40 including earpieces 41 and a nose bracket 43. The lens 36 carries two crossing perpendicular lines 42 and 44. The line 42 is horizontal and occupies the upper portion of the lens while the line 44 is vertical and is inward from the center of the lens 36. In a related manner, the lens 38 carries a horizontal line 46 near the lower edge thereof and a vertical line 48 inward of center. The lines 48 and 60 also cross in perpendicular relationship.

Upon looking through the glasses of FIGURE 3, the wearer sees a field of vision 49 (FIGURE 3a) related to a grid 50. The grid 50 is formed by the composition of the lines 42, 44, 46 and 48 resulting from fusion of the stimuli perceived by the two separate eyes. It is to be noted that although the grid 50 is precisely defined in the field of vision as shown in FIGURE 3a, there is essentially no loss of information because the lines on the lenses 36 obstruct different areas from the lines on the lens 38. As a result, obstructed portions of one field of vision are complimented by the other field of vision.

In considering the fusion of the two fields of vision perceived by the eyes through the lenses 36 and 38, reference will be had to FIGURE 3b indicating a focal plane 52 for one eye and a focal plane 54 for another eye. A dot 56 indicates the line 44 as viewed from the focal plane 52 while a dot 58 represents the line 48 for the focal plane 54. In accordance with the human image composition, the two focal planes 52 and 54 are superimposed (lower portion of FIGURE 3b) to provide a dimensional perception, in which superimposition the dots 58 and 56 appear as vertical side frames, with the dot on the left of the field of vision appearing on the right retina and vice versa. This analysis reveals the interesting consideration that the lines 44 and 48 (FIGURE 3) are substantially equally spaced from the human centerline yet accomplish the desired frame grid 50.

In using the concentrator in the form of the glasses as shown in FIGURE 3, the human subject composes the grid 50 as shown in FIGURE 3a. That composition indicates superimposition of the two visual fields which in turn provides the subject with a state of orientation within his physical environment. Thereafter, if the human subject is exposed to adverse conditions tending to result in disorientation, the grid 50 affords him a constant-reference concentration device in close proximity, with which the loss of optical fusion and orientation can be detected, then fusion reinstated and preserved. If the subject has lost orientation, the same considerations are applicable with respect to regaining his orientation or equilibrium by accomplishing optical fusion.

In some situations and for certain people, it has been discovered to be important to incorporate a directional sense within apparatus as disclosed herein. Specifically, for example, it has been discovered helpful to provide an indication of the left from the right. Such an indication may appear extreme to persons not skilled in the art to which this invention relates; however, the need for such an indication will be readily apparent to those persons having experience in the air space or the ocean depths.

Referring to FIGURE 4, there is shown a concentrator 60 in the form of a pair of spectacles or glasses having lenses as previously described which are provided with and are carried in frame structure 66. The markings on the lenses in addition to annulus 62 may include lines 68 and 70 respectively which are vertical and equally displaced from the human subject center line. The lines 68 and 70 may be of different colors. For example, the line 68 is red while the line 70 is blue in color. Alternatively the left line may be wavy as shown and the right line 70 straight. Thus the user of the concentrator 60 knows that the wavy or red line 68 adjacent any object in his field of vision indicates the left side thereof. For example, a child learning to read upon seeing the word |saw| knows that the word is read from the wavy to the straight line and is "was," or the letter |b| is really "d."

The vertical lines on the structures considered above provides the wearer an indication of the vertical. Such a structure is useful for persons who experience difficulty preserving orientation in a ground referenced environment; however, such structure becomes inadequate when the subject's environment becomes the ocean depths, air space or outer space. Of course, these are the environments in which persons are most likely to experience loss of orientation. A structure in accordance herewith for use in such environments is shown in FIGURES 5, 6, 7 and 8 and will now be considered in detail.

Referring initially to FIGURE 5, there is shown a pair of goggles or glasses 100 which are also shown in top plan view in FIGURE 7. The goggles 100 include lenses 102 and 104 which are joined by a nosepiece 106 to define an exterior obtuse angle (FIGURE 7). That is, each of the lenses 102 and 104 are held within the frame structure 108 so that they extend outwardly from the wearer's nose in a plane angularly offset forward from the plane to the wearer's eyes. The lenses 102 and 104 are only semi-transparent and may take a form of well-known mirrored lenses or other beam-splitting optical glass structures. Affixed at the sides of the glasses 100 and carried on the earpieces 110 and 112 are small projectors 114 and 116 respectively. The projectors, as will be considered in detail, are extremely simple mechanisms and serve merely to provide a light image that is projected onto the surface of the lenses 102 and 204. That is, as shown in FIGURE 6, light images are projected along focal axis indicated by lines 118 and 120 to be presented as concentrators or indicators 107 (FIGURE 5). The form of the concentrators 107 is arrows which in view of the operation of the projectors 114 and 116 are oriented in the vertical to designate the polarity of natural or artificial gravity. That is, the wearer of the glasses under consideration is provided a stable reference related to gravity, for example, which continues to function properly when the wearer is completely inverted with respect to the reference.

Considering the similar projectors 114 and 116 in greater detail, reference will now be had to the diagrammatic view of FIGURE 7 showing a small light source 113 powered by a battery 115 to cast a light beam through a mask structure 119 onto the lens 102. The mask structure 119 is shown in FIGURE 8 and includes a mask 121 which is centrally mounted on a pin 124 and which defines an internally arrow shape aperture 126. The pin 124 is affixed to a housing 128 whereby the mask 121 is freely rotatable thereon. A weight 130 affixed to the mask 121 then orients the mask so that the arrow shape 126 perpetually indicates the vertical. The mask can be provided in plane (cylindrical) form of dimensioned (spherical) form.

Thus, the beam from the light 113 passes through the mask structure 119 providing a light image of an arrow that is projected onto the lens 102 and reflected into the user's eye. Of course, the formation of the light arrow on the lens 104 results from a similar structure. Thus, regardless of physical orientation of the wearer, he is continually provided with a constant reference of the verical superimposed upon his external visual field. In using this structure, the subject may somewhat disregard the references provided him unless he loses orientation. During such loss, aircraft and sapce pilots not only lose individual orientation but not infrequently also lose the ability to restore orientation by referring to instruments or other nearby physical objects. Such objects are apparently not sufficiently intimate to the pilot to afford a basis for reorientation. In such a situation, the wearer of the glasses 100 would normally observe the arrows 107 utilizing them as a stable gravity-referenced device by which he could accomplish reorientation. It will also be recognized that the use of a projector to place the concentrator image on a lens may be used for exercising the eye, e.g. to overcome excess divergence or convergence.

In general, from the above consideration it may be seen that applicant has discovered a variety of effective structures for use by persons who for one reason or another experience difficulties resulting from loss of orientation. These structures have been determined to be effective training aids under certain circumstances as well as useful for prolonged guidance. It is readily apparent that these various devices may take a multiude of different forms many of which will be readily apparent to persons skilled in the art. For example, the concentrator may take the form of a segmented circle with alternate segments on each lens of a pair of glasses. However, it is to be understood that the scope hereof is not to be limited in accordance with various structures set forth herein or various readily apparent structures but rather shall be interpreted in accordance with the claims set forth below.

What is claimed is:

1. An orientation apparatus for use by a human subject to assist sensory coordination by retinal correspondence, comprising:
   a pair of eyepieces;
   support frames for supporting said eyepieces in fixed associated viewing relationship respectively to the eyes of said subject; and
   opaque narrow line means on said eyepieces to thereby mutually define a closed viewing area for said subject, said line means on each of said eyepieces extending with a substantial vertical component in relation to said subjects eyes, said line means of said eyepieces furthermore being substantially non-obstructing in that said line means on each eyepiece obstructs a substantially different area than said line means on the other eyepiece when said eyepieces are oriented in said support frames and employed by said subject in retinal correspondence.

2. An orientation apparatus according to claim 1 wherein said line means on said eyepieces mutually define a rectangular area, said lines on each of said eyepieces including a horizontal line and a vertical line.

3. An orientation apparatus according to claim 1 wherein said eyepieces comprise plain glass and said lines comprise etched markings.

4. An orientation apparatus according to claim 1 wherein said support frames include eyepiece frames, a nose piece and ear holders.

5. An orientation apparatus according to claim 1 wherein said line means on said eyepieces mutually define a rectangular area, said lines on each of said eyepieces including a horizontal line and a vertical line wherein said eyepieces comprise plain glass and said lines comprise etched markings and wherein said support frames include eyepiece frames, a nose piece and ear holders.

References Cited

UNITED STATES PATENTS

| Re. 19,413 | 1/1935 | Bugbee | 351—168 |
| 2,009,700 | 7/1935 | McMurdo | 351—44 X |
| 2,378,493 | 6/1945 | Miles | 351—49 |
| 3,264,002 | 8/1966 | Palumbo | 351—158 X |
| 3,279,878 | 10/1966 | Long | 351—160 X |

OTHER REFERENCES

J. W. Bettman et al.: "A Contact Lens. Telescopic System" Am. Journal of Ophth., January 1939 (Am. Inst. Health) pp. 27–33.

DALTON L. TRULUCK, Primary Examiner

JOHN D. YASKO, Assistant Examiner

U.S. Cl. X.R.

351—45